United States Patent [19]

Aumiller

[11] Patent Number: 5,262,815
[45] Date of Patent: Nov. 16, 1993

[54] MODULAR PHOTOBOOTH PHOTOGRAPHY SYSTEM

[75] Inventor: Mel D. Aumiller, Chesterfield, Mo.

[73] Assignee: Consumer Programs Incorporated, St. Louis, Mo.

[21] Appl. No.: 888,808

[22] Filed: May 27, 1992

[51] Int. Cl.$^5$ .................. G03B 15/06; G03B 17/38; G03B 29/00

[52] U.S. Cl. ................... 354/290; 354/266; 354/81

[58] Field of Search ............... 354/290, 80, 81, 76, 354/266

[56] References Cited

U.S. PATENT DOCUMENTS

| | | | |
|---|---|---|---|
| 1,830,770 | 11/1931 | Simjian | 354/290 |
| 3,398,664 | 8/1968 | Bonatsos | 354/290 |
| 4,804,983 | 2/1989 | Thayer, Jr. | 354/290 |
| 4,896,175 | 1/1990 | Thayer, Jr. | 354/290 |
| 4,959,670 | 9/1990 | Thayer, Jr. | 354/290 |
| 5,028,997 | 7/1991 | Elberbaum | 354/81 X |
| 5,072,246 | 12/1991 | Thayer et al. | 354/290 X |
| 5,184,160 | 2/1993 | Massarsky | 354/290 X |

Primary Examiner—Michael L. Gellner
Assistant Examiner—Jae N. Noh
Attorney, Agent, or Firm—Kalish & Gilster

[57] ABSTRACT

A user-actuated modular photography system for use in a photobooth or like enclosure to provide user self-photography with realistic user-selective user image previewing includes a camera module having a housing including a photographic camera having a lens oriented for viewing the user when within camera lens view of the photographic camera, a video camera and a gimballed camera mount assembly interconnecting the video camera with the photographic camera for video imaging by the video camera of the photographic camera lens view of the user, the video camera providing a user video image signal. There is also a gimbal drive mechanism for providing driven gimballed movement of the camera mount assembly for selective aiming of the camera lens axis within at least one aiming plane and for selective rotation of the camera lens view within an image resolution plane between vertical and horizontal orientations. Also included is at least one modular display device for colocation with the camera module within a photobooth or like enclosure. The modular display device includes video image display mechanism for receiving the user video image signals for vertical and horizontal modes of display of the user video image for user image previewing prior to user image exposure by the photographic camera. Circuit means are included for causing the video display means to switch automatically between the first and second display modes in response to said lens view rotation. Also, a user control device provides for user selective remote control of the aiming movement of the camera assembly, selection of the image rotation between the vertical and horizontal orientations, and for user selective remote actuation of the photographic camera for thereby capturing user photographic images in accordance with user previewed realistic display thereof by the video display mechanism.

21 Claims, 6 Drawing Sheets

MODULAR PHOTOBOOTH PHOTOGRAPHY SYSTEM

BACKGROUND OF THE INVENTION

The present invention relates generally to photobooth self-actuated photography and, more particularly to a user-actuated modular photography system for use in a photobooth or other enclosure or area to provide user self-photography with realistic user-selective user image previewing, as well as video self-recording by the user.

It previously has been known to provide previewing prior to photographic exposure. Indeed, the concept dates back at least to the 1931 U.S. Pat. No. 1,830,770 to Simjian disclosing a photobooth equipped with a pose-reflecting mirror for permitted a user to view the user's image before user self-actuated photographic exposure.

Various schemes for coupling video cameras to photographic cameras have also been proposed for allowing a video camera to be used for video imaging and display of a photographic subject. In Bonatsos U.S. Pat. No. 3,398,664, a combined television and photographic coin-operated machine was proposed which included a vertical wall facing the user in which are located apertures for a video camera aimed toward the user and a video monitor for allowing the user to see his or her image, the user being presented with an outward jutting control console with a switch enabling tilting up or down of the camera during a delay period at the end of which a negative image formed on the video monitor is exposed automatically to photographic paper to produce a positive photoprint of the video-derived image, but without the benefit direct photographic exposure.

A prior art commercial photography arrangement known by the service or trademark designation VIDEO VISION has provided direct photographic exposure for high quality portraiture with video previewing before exposure. Therein, a camera assembly having a common mount for both video and photographic cameras is selectively aimed by an operator to provide previewing imaging of a subject, followed by selective single or multiple exposure of the subject in a variety of operator-controlled formats manually selected by the operator with tilt-and-pan drive for the camera assembly being controlled by cable remote means by the operator as the photographic subject is posed by the operator for such exposures.

It has been proposed to employ the latter prior art devices for use in a photobooth of specialized construction including a common end wall with openings therein configured for video and photographic cameras, a video display device, and various controls, including a remote control, and lighting at the end wall so that a user seated, as on a bench at the opposite end of the photobooth, may both be in the normal camera field as well have provided usable displays for previewing and control indication. Thayer U.S. Pat. Nos. 4,959,670; 4,896,175; and 4,804,983 represent such dedicated photobooth technology of the prior art.

Among the problems of such a dedicated photobooth is that the photobooth is unfortunately of specialized construction, being in effect hybridized to conform to, enclose, protect and present the video and photographic apparatuses, lighting and attendant controls. Further, such a dedicated photobooth hybrid is necessarily one in which form too rigidly follows function, even though it would often be much more desirable to permit a free form booth construction of possibly variable dimensions and accommodations suited to different possible commercial sites and space availabilities, which may be highly variable. So also, such specialized photobooths as proposed provide objectionable site installation difficulties, as for example requiring considerable pre-installation and elaborate site wiring before site installation and further attendant logistical problems during installation and in the event, as may be expected, of site relocation. Such proposed specialized photobooth types also require for their configuration, installation and set-up the services of highly skilled engineering or technical personnel, or else a high degree of factory pre-assembly and testing, whereas it would be rather more desirable to be able to utilize personnel of less specialized, routine skill level and to permit facile, rapid installation by such less-skilled personnel as by only simply connecting modules. A disadvantage also of such specialized, dedicated photobooth integral constructions is that they do not permit self-actuated video previewed photography except within the rigid confines of the specialized, integral booth per se.

Prior art video previewing photobooth-photography devices as described have in any event provided less than desirable video image previewing because of indirect video capture of an image to be previewed with consequent loss of intensity and serious degradation of video resolution, and so a resultant inability of the user to preview the image with desired detailing. Another previewing limitation typical of such devices is that the video image may be reversed across a vertical axis by optical constraints so that the subject is compelled to preview his/her image reversed as if looking merely into a mirror rather than being able to see a true image during previewing corresponding to that which will be taken during subsequent photographic exposure. In either event, the user is denied high-quality, realistic image previewing.

SUMMARY OF THE INVENTION

It is an object of the present invention to provide a system for high quality self-actuated photography, and specifically a user-actuated modular photography system for use in a photobooth or other enclosure or area to provide user self-photography with high-quality, realistic user-selective user video image previewing.

Another object of the invention is the provision of such a system which can be used as well for user-selective video taping with optional sound recording as an adjunct or alternative to photographic exposure.

Among still other objects of the present invention may be noted the provision of such a user-actuated photography/video system which is of such modular character as to be capable of use in a variety of different photobooth shapes and sizes, as well as in other enclosures and spaces, such as temporary studios, convention assembly areas, meeting rooms and other areas, as for example, a small room, curtained area or other space where it might be desired to provide for self-actuated photography or video recording of such character; which provides for video input of unsurpassed video sensitivity and high-quality image input without need for intermediate image resolution between photographic camera and video camera; in that the system allows video image previewing as well as direct video image input using the same lens for video input as for photographic image input, without exhibiting loss of intensity or other heretofore unacceptable degradation of video resolution, and so permitting the user to preview the image with desired detailing and with such high video sensitivity as to allow video previewing and direct video recording to take place in ordinary low intensity lighting without recourse to high intensity floodlighting, spot lighting or stroboscopic lighting.

A further object of the invention is the provision of such a modular user-actuated photography/video system which avoids image reversal resulting from use of reflex mirror video capture techniques, as well as intermediate image resolution, by image re-erection and to so permit the subject to preview and view his/her image in a true format corresponding exactly to that which will be taken during subsequent photographic exposure.

It is yet another object of the present invention to mount the video and photographic mechanisms in such a manner as to be extremely strong and durable, as well as being reliable in automatic functioning and maintenance of a preselected relationship between the video and photographic mechanisms so as to reliably maintain focus of the video image captured through the photographic camera lens.

Among additional objects of the invention may be noted the provision of such a modular user-actuated photography/video system which is in the form of mobile, easily-used and easily-connected modules which may be assembled simply and with facility so as to avoid siting and installation difficulties, to avoid pre-installation and site wiring before site installation and further attendant logistical problems during installation and site relocation. It is a further object that such system does not require for its configuration, installation and set-up the services of highly skilled engineering or technical personnel; is amenable to convenient, economic mass-production and testing; allows use of installation and service personnel of less-specialized, routine skill level; and permits rapid installation by such less-skilled personnel as by simply connecting modules.

Still further, it may be noted that it is an object of the invention to provide such a modular user-actuated photography/video system which allows the user selectively to view a video image in either a vertical or horizontal mode of display, and wherein video displays automatically revert to the desired portrait or horizontal display mode in accordance with photographic/video input of whichever type is selected by the user.

Briefly, a user-actuated modular photography system for use in a photobooth or like enclosure to provide user self-photography with realistic user-selective user image previewing, or alternatively video recording includes a first modular enclosure, namely a camera module. It includes a photographic camera having a lens oriented for viewing the user when within camera lens view of the photographic camera, a video camera and a camera mount assembly interconnecting the video camera with the photographic camera for video imaging by the video camera of the photographic camera lens view of the user, the video camera providing a user video image signal.

The camera module further includes gimbal means for providing driven gimballed movement of the camera mount assembly for selective aiming of the camera lens axis within at least one aiming plane.

The system further includes modular display devices for colocation with the camera module within a photobooth or like enclosure, the modular display devices preferably being in the form of second and third modular enclosures, each including a video image display mechanism for receiving the user video image signals for respective vertical and horizontal modes of display of the user video image for user image previewing prior to user image exposure by the photographic camera; there being an electric circuit of the system for causing the video display mechanism to switch automatically between the first and second display modes in response to the image rotation.

Also part of the system is a remote control mechanism for user selective remote control of exposure and at least the aiming movement of the camera assembly. The user is also provided with control over the image rotation between the vertical and horizontal orientations, thus providing user selective actuation of the photographic camera for capturing user photographic images in accordance with user previewed realistic display thereof by the video display mechanism.

Other objects and features will be in part apparent and in part pointed out in the full description which follows.

BRIEF DESCRIPTION OF THE DRAWINGS

Corresponding reference characters indicate corresponding parts throughout the several views of the drawings.

DESCRIPTION OF THE PREFERRED EMBODIMENTS

Referring now to the drawings by reference numerals, A generally designates a user-actuated modular photography system according to the present disclosure, as configured for use in a photobooth B or like enclosure to provide user self-photography with realistic user-selective user image previewing, or alternatively user self video recording.

System A is modular in the sense of being constructed as distinct, cooperatively interconnected free standing modules which may most preferably be installed in the manner shown in FIGS. 1-3 and 17.

These modules include a first modular cabinet-like enclosure, namely a camera module generally designated 10, and second and third modules which constitute lighting and display modules, and these are designated generally 12L, 12R. All of the three modules are preferably of rectangular, open-backed cabinet shape and are vertically elongated. Modules 10, 12R, 12L are positioned within booth B by location in an alcove end 13, with preferably the camera module 10 located between the lighting and display modules 12L, 12R. The modules may be in contiguous or separated relationship within alcove end 13, into which opens from the exterior of the booth an access door 14 which in the arrangement shown is centered the camera module for permitting authorized access to the camera apparatus within it, all as soon evident from the following disclosure and explanation.

Booth B includes user door 15 of slidable recessed type, i.e. a so-called pocket door, to be received by a storage recess 18 when opened for user ingress/egress and preferably a bench-type seat 20 of normal seating height for the user to be seated for self-photography and/or video image and sound recording by system A. A suitable backdrop 22 behind the user may be in the form of different possible pull-down screens or laterally relocatable curtains of various colors to permit user selection or booth configuration for providing an appropriate background during portraiture and/or video recordation. An optional "hair light" 19 can be mounted on the ceiling of Booth B for photographic enhancement. Such hair light 19 (shown in phantom in FIG. 1) is preferably a light of the type known as a "slave" which flashes substantially simultaneously with and in response to the flash of light normally caused to occur during a user-initiated photograph.

Figure 4:
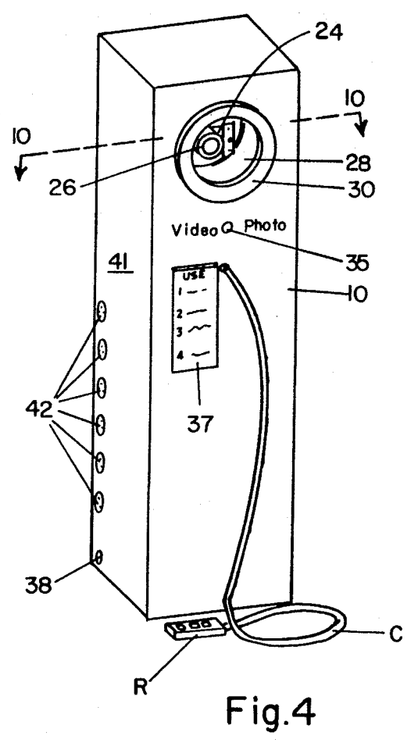
FIG. 4 is a perspective view of a free-standing camera module of the system of FIG. 1.

FIG. 4 illustrates that module 10 includes combined photographic and video camera apparatus capable of capturing video image or taking still photographs in either horizontal or vertical format, as explained hereafter, which apparatus is located within module 10 and oriented for aiming generally toward bench 20 to view the user, which may be one or more persons who occupy the booth.

Figure 10:
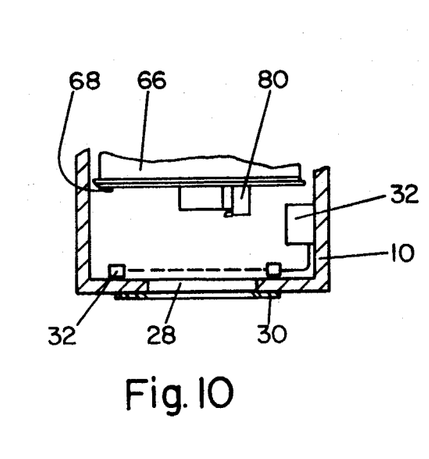
FIG. 10 is a partial cross-sectional view through a camera module of the system of FIG. 1, taken on line 10—10 of FIG. 4, illustrating the optional placement of components of a certain intrusion detection and warning mechanism thereof.

More specifically, module 10 houses a suitable commercially available single lens reflex (SLR) 35 mm photographic camera 24 having a suitable motor drive and electrically triggered automatic rewind mechanism and further having a lens 26 oriented and located behind a circular lens opening 28. In the preferred embodiment, the usual view finder of camera 24 is removed for clarity of the video image therethrough as later explained. Inside of module 10 opening 28 may be equipped with a proximity detector or intrusion sensor 32, as shown in FIG. 10 and preferably being of the laser or "electron beam" variety for prevention of vandalism of the camera apparatus by one reaching through opening 28. Alternatively, opening 28 may be covered by glass.

Thus, lens 26 is directed toward bench 20 for viewing the user to be seated thereon and who will be within camera lens view of the photographic camera. Not readily visible as a whole to the user (and not appearing in FIGS. 1-3 but described more fully below in regard to FIGS. 6, 7 and 9) is a video camera 34 and a camera mount assembly generally designated 36 interconnecting the video camera 34 with photographic camera 24 for video imaging by a small, suitable commercially available video camera 34 of the photographic camera lens 26 view of the user, video camera 34 providing a user video image signal. The mounting and interaction of cameras 24, 34 will be discussed in detail hereafter.

Before discussion of the camera mechanism, refer accordingly to FIGS. 4, 5, 12-14 and 17 for an understanding of the features of the video display and illumination modules 12L, 12R.

Figure 5:
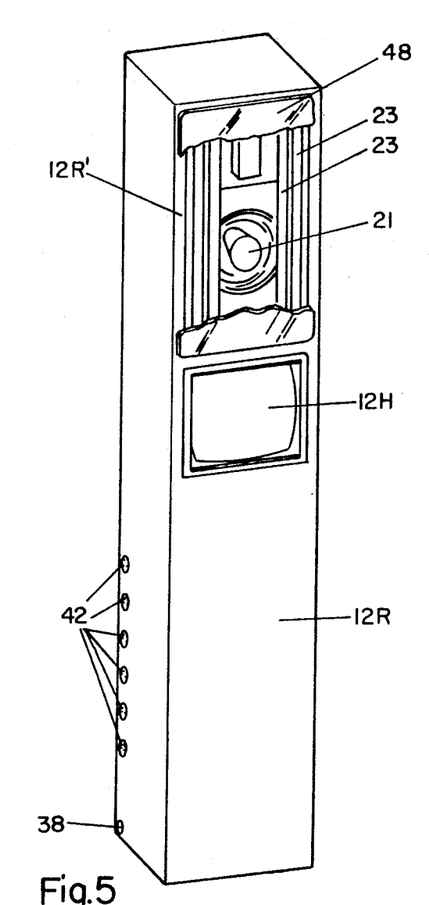
FIG. 5 is a perspective view, partially broken away, of one embodiment of a video display and lighting module of the system of FIG. 1.

The lighting and display modular enclosures 12L, 12R include video image display means 12V, 12H, respectively, for receiving and displaying the user video image signals for display of the user video image for user image previewing prior to user image exposure by photographic camera 24. Each module 12L, 12R is also provided with a respective upper extension 12L', 12R' including photography light sources oriented for illuminating the user for such photographic exposure as, for example, the arrangement shown in FIG. 5 with a strobe light 21 located between pairs of fluorescent lights 23. Upper extensions 12L', 12R' may be provided as unitary parts of corresponding modules 12L, 12R (as shown in FIG. 5), or, if desired, may be separate, free-standing boxes supported merely by placement on the modules 12L, 12R and having open backs for easy access to the light bulbs within.

In module 12L there is provided a video display (or monitor) 12V for vertical display of vertical format images captured by module 10, and similarly module 12R includes a video display 12H for horizontal display of horizontal format images captured by module 10. Whether the user desires to have images captured in horizontal or vertical format, there are provided corresponding horizontal and vertical modes of display of the user video image for user image previewing prior to user image exposure by the photographic camera, as well as during any video camera imaging, as for video recordation. Conceivably, it may be sufficient for video recordation to be offered only in horizontal format.

With further reference to FIGS. 1-4 (and in closeup in FIG. 11), the user is provided with a remote control unit R connected by a flexible cable C to module 10 for user selective remote control of the aiming movement of the camera assembly, zooming and user selection of the image rotation between the vertical and horizontal orientations, and for user selective remote actuation of the photographic camera for thereby capturing user photographic images in accordance with user previewed realistic display thereof by the appropriate video display 12V or 12H, i.e., according to the user's desire. Cable C is of sufficient length to permit the user to operate the controls of the remote unit R from any comfortable position with the booth, as when seated on bench 20.

Referring to FIG. 4, internally within camera module 10, is provided a photographic camera 24 having a lens 26 oriented and located behind a circular lens opening 28 of camera module 10. Lens opening 28 is demarcated by a ring 30 which is formed of material and color contrasting with that of module 10, in order to draw the user's attention toward lens 26, and above ring 30 are signal lights 31, 33 for illuminating when photographic imaging and recordation may take place. For example, signal lights 31, 33 may be red and green, respectively, to alert the user as to when a photograph may be taken. Lens 26 is also used for video imaging by the assembly to be explained below, so that signal lights 31, 33 can inform the user when the camera mechanism is ready for use for its video-capture mode of operation. A format button 35 is provided beneath ring 30 for user selection of either the video or photographic mode of use and instructions 37 are mounted in an obvious location, such as below ring 30, to assist the user in operating system A.

Figure 12:
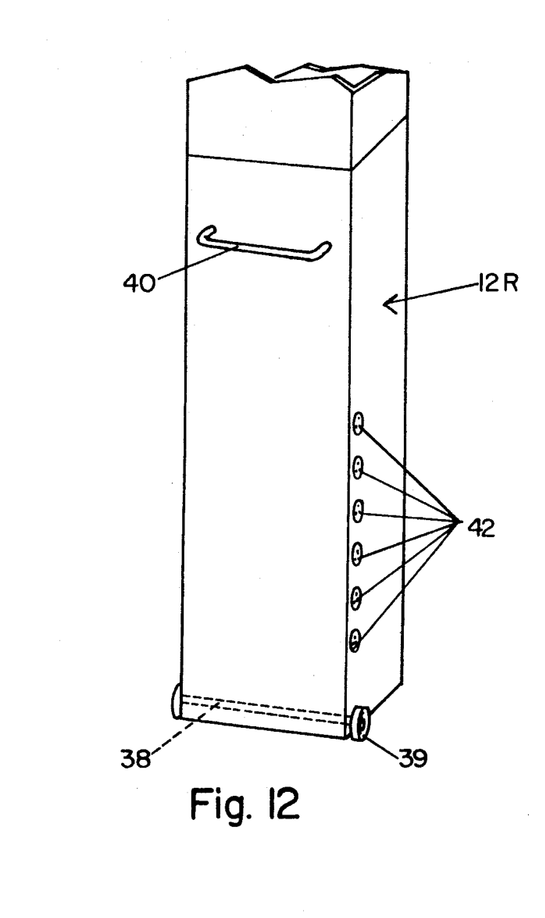
FIG. 12 is a partial rear perspective view of an alternative embodiment of a lighting and display module of the inventive system illustrating certain mobility features.

Each module 10, 12R, 12L is constructed of suitable materials for permitting mobility thereof without sacrifice of strength and preferably includes an adaptor, such as rod 38 for attachment of removable wheels 39 and a handle 40, as shown for example in FIG. 12, for ease of movement. The advantage of wheels 30 being removable is that after positioning of a module, removal of the wheels thereof deters repositioning or theft of the module.

Module 10 preferably includes equipment rack shelves (FIG. 17) as at 44 for mounting of video recording equipment ("VCR") 45 and camera control and power supply circuits 46 appropriate to the control functions to be commanded by user hand held remote control device R, as well as power pack 47. On at least one surface, as, for example, 41, of the camera module 10 (and optionally the other modules as well), there are provided multiple electrical outlets 42, each of multiple-pin type, for connection of the lighting and display modules 12L, 12R and their lighting and display components. It is accordingly to be understood that module 10 is usually positioned as the central module and is adapted for connection to, and control of, the other modules 12L, 12R, for operation which is user-implemented by remote control unit R.

Figure 17:
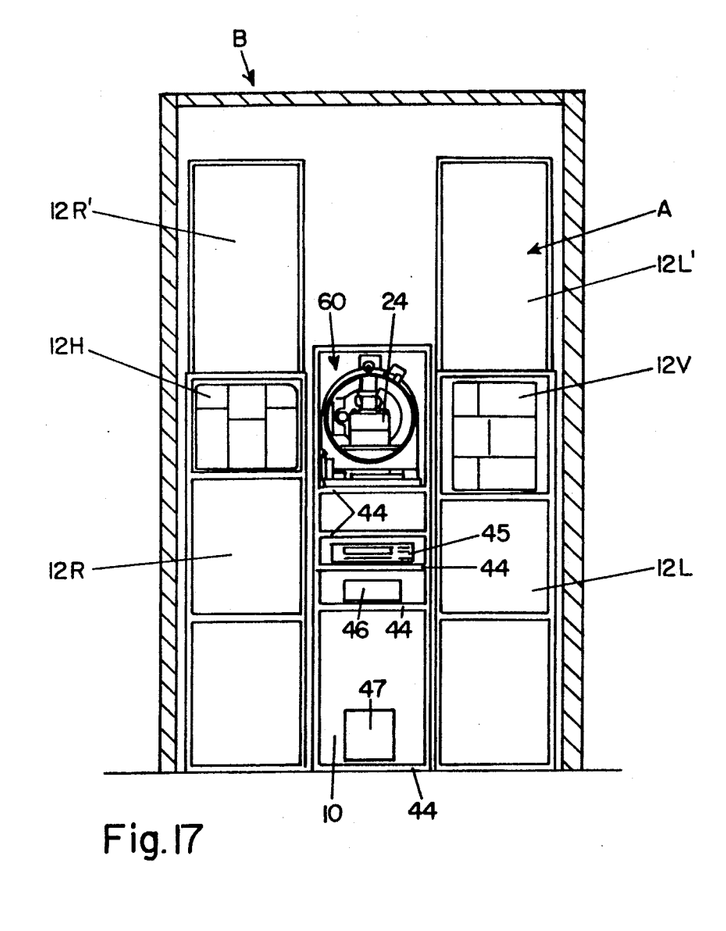
FIG. 17 is an elevational view of the video/photography system of FIG. 1 from behind the modules therein and with the entire booth end wall removed for ease of visibility.

FIG. 5 illustrates one embodiment of display and illumination module 12R. It consists of a rectangular, vertically elongated cabinet configuration, wherein the lighting extension 12R' is an upper portion thereof and may be affixed to or mounted upon module 12R as an upper integral extension as shown in FIG. 5, or alternatively, as an independent, separable open-backed upper cabinet portion as illustrated in FIG. 17. FIG. 5 further illustrates that supported so as to face outwardly from cabinet 12R is a video display device 12H preferably being a monitor in the horizontal position. In a corresponding area of module 12L is a similar video monitor for video display in the vertical position, the same being designated by numeral 12V.

Mounted forwardly within upper module 12R' (and similarly in module portion 12L' are low intensity lights 23 which provide adequate lighting for video recording purposes, and may be, for example, conventional fluorescent bulbs preferably provided in longitudinal parallel pairs toward the outer edges of modules 12R', 12L. More centrally yet forwardly fixed within each module 12R', 12L' is a strobe light 21 to provide appropriate lighting for photographic purposes. Lights 21, 23 are covered on each module 12R', 12L' by a translucent plastic shield 48 attached, for example, by screws 50 and which shield 48 provides appropriate diffusion of light from within each module 12L', 12R' and prevents access to light bulbs by users. For purposes of light bulb replacement, each cabinet 12R', 12L' may be accessed rearwardly.

Figure 13:
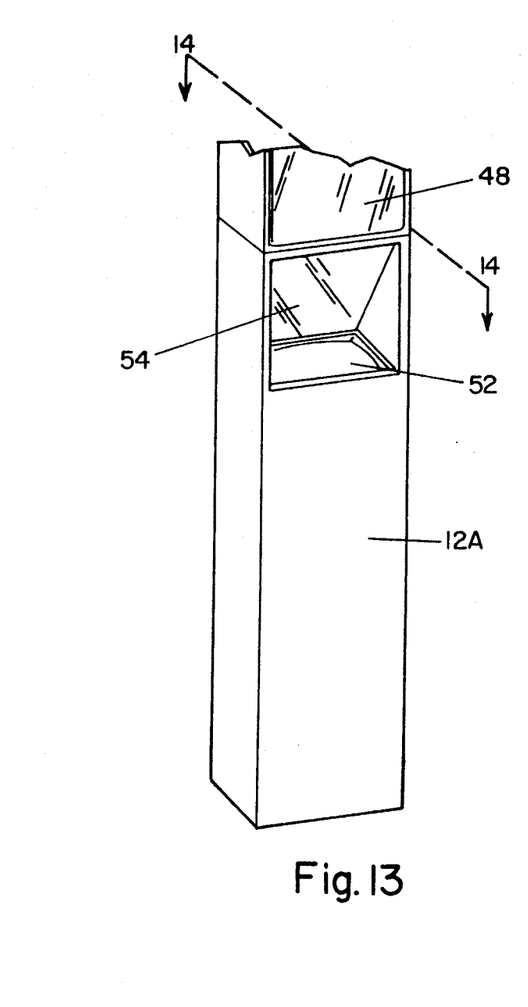
FIG. 13 is a fragmentary front perspective view of another alternative embodiment of a lighting and display module of the inventive system.
Figure 14:
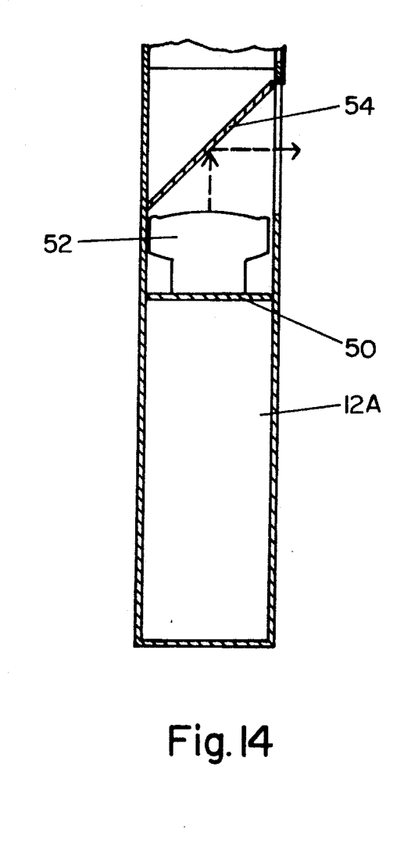
FIG. 14 is a vertical sectional of view of the module of FIG. 13 taken on line 14—14 thereof.
Figure 15:
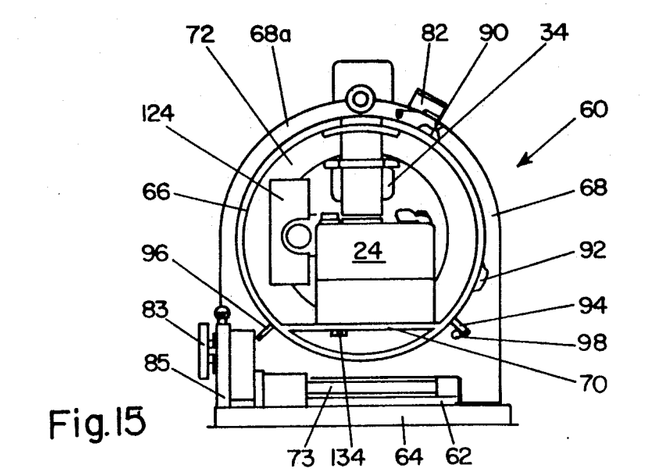
FIG. 15 is a simplified rear elevational view of the camera mount assembly of FIG. 6 positioned as for taking either video or horizontal still photographs.
Figure 16:
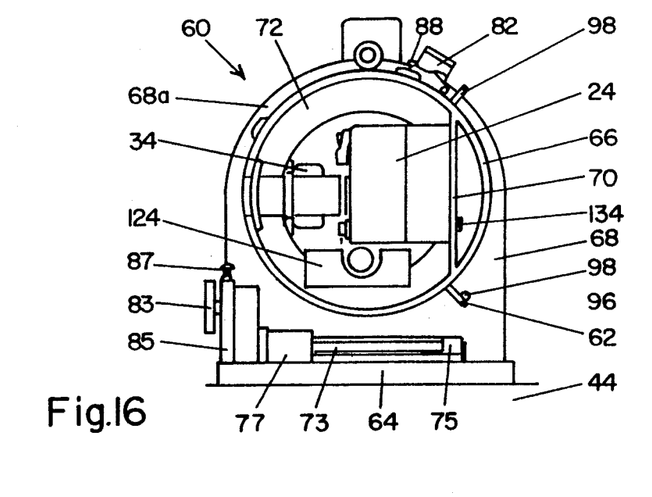
FIG. 16 is a simplified rear elevational view of the camera mount assembly of FIG. 6 positioned for taking vertical still photographs.

FIGS. 13 and 14 illustrate an alternative embodiment of an image display module 12A which is adapted to prevent image reversal by provision of cabinet 12A with a horizontal shelf 50 for supporting a display device such as television screen 52 in a backwardly reclined position such that the image projected thereby will travel as indicated by the arrows in FIG. 14 upwardly to intersect an angled first surface mirror 54, causing the displayed image to be reflected therefrom outwardly toward the user. Provision of the image display module 12A by this embodiment permits direct transfer to display device 50 of an image from a video or photographic camera while providing the user with what appears to be a normal, rather than reversed image, as would normally be the case. Use of a first surface mirror for mirror 54 is particularly preferred in that a more clear image is provided by coating the mirror on the outward face of the glass, rather than on a rearward face as, is the usual practice. Use of a conventional mirror coated on the rearward surface of the glass requires the image to go through the glass and hit the coating prior to reflecting and passing again outwardly through the glass so that a substantial degree of image distortion may be caused thereby.

With reference to FIGS. 6 through 9, 15 and 16, the camera and mounting arrangement thereof will be further discussed below.

Figure 2:
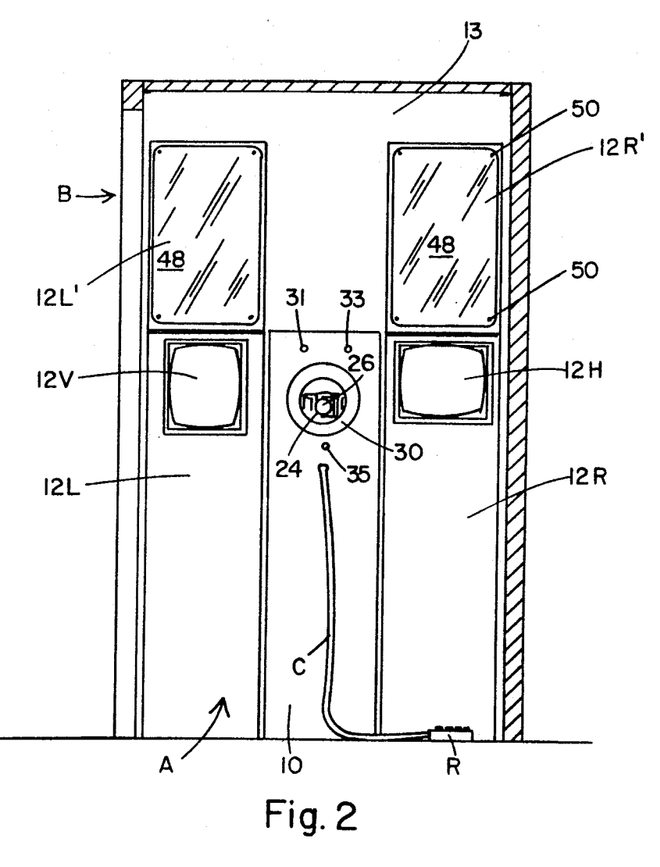
FIG. 2 is a vertical sectional view taken through the photobooth of FIG. 1 on line 2—2, showing in elevation modular elements of the present system.
Figure 3:
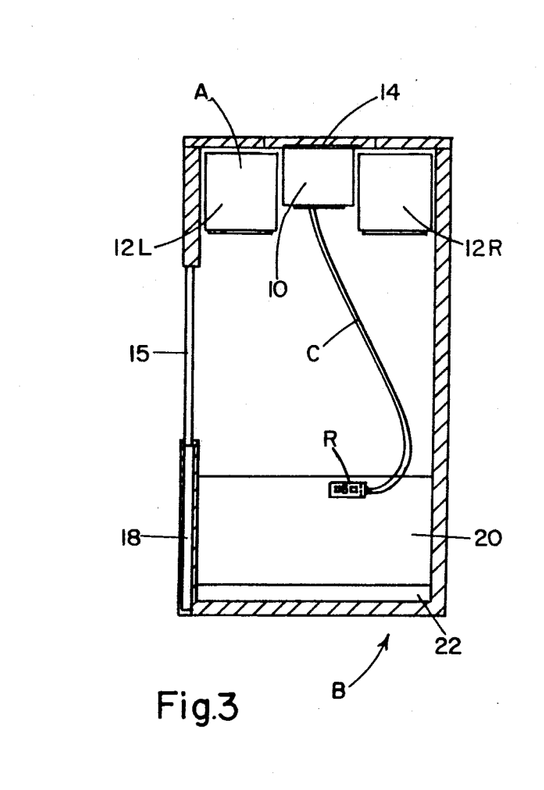
FIG. 3 is a cross-sectional view taken on line 3—3 of FIG. 1, showing in top plan view modular elements, including camera and video display modules and a user remote control device of the system of FIG. 1.
Figure 6:
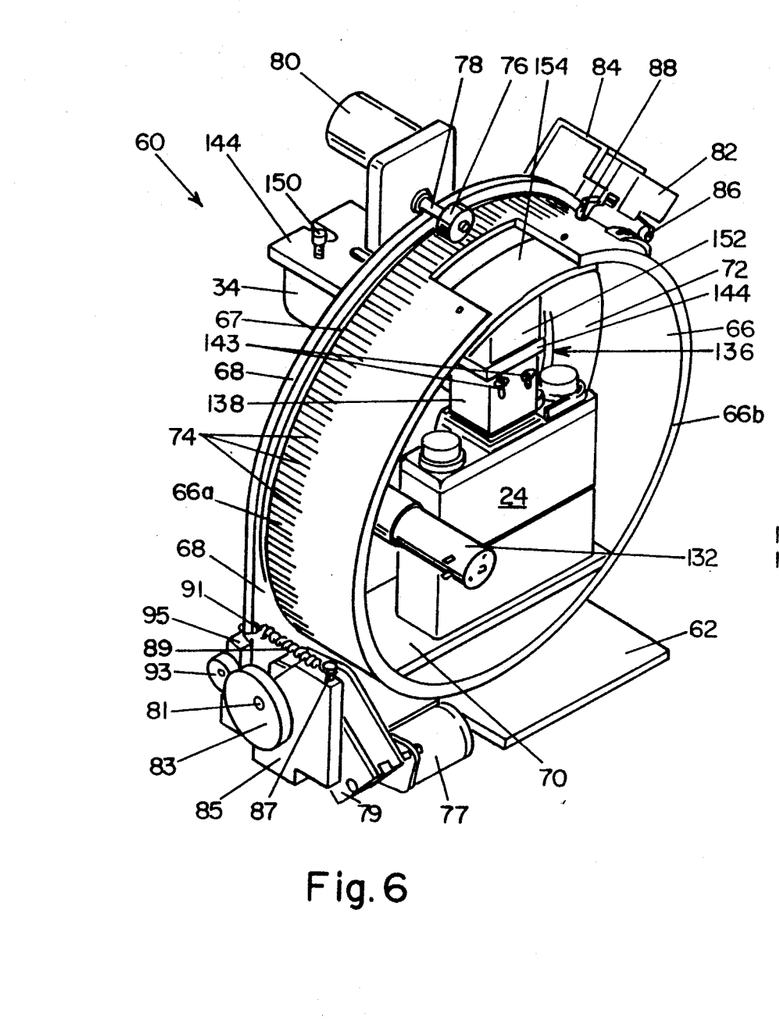
FIG. 6 is a rear perspective view of a camera mount assembly portion of the system of FIG. 1.
Figure 7:
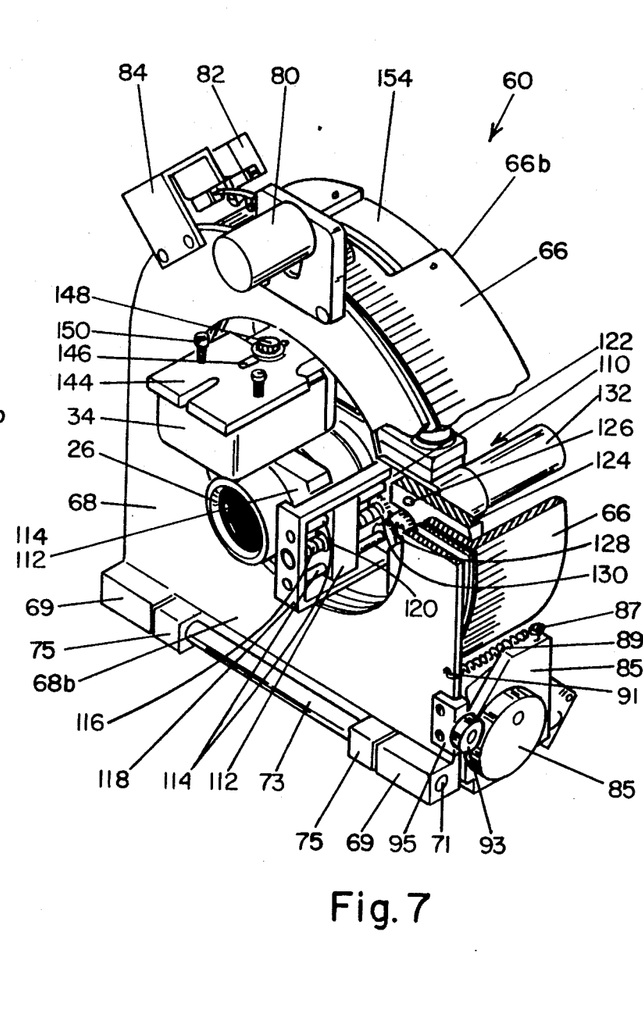
FIG. 7 is a front perspective view of the assembly shown in FIG. 6, partially broken away.
Figure 8:
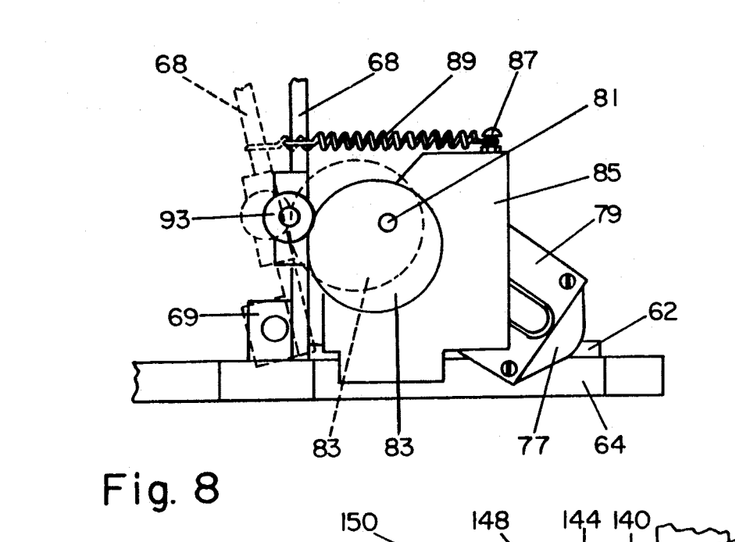
FIG. 8 is a enlarged partial schematic view, of a gimbal aiming drive mechanism of the assembly of FIG. 6.
Figure 9:
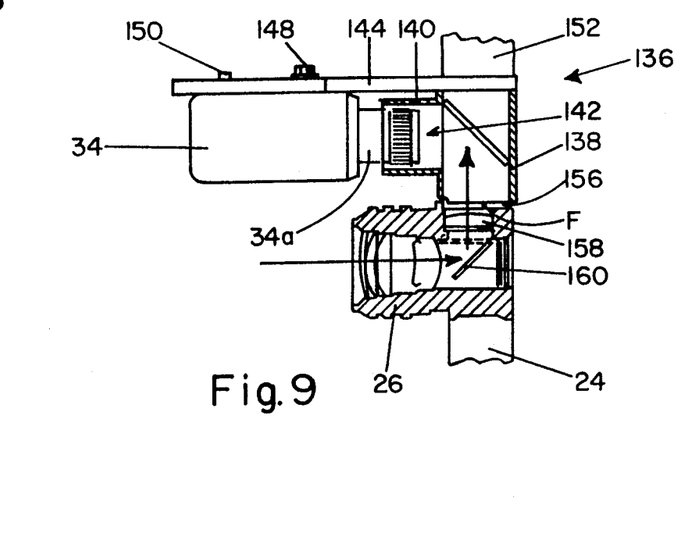
FIG. 9 is a simplified partial sectional and partial elevational view of certain elements of photographic and video cameras of the system illustrative of video imaging principles of the assembly of FIG. 6.

FIGS. 6, 7 and 9 illustrate the interconnection of video camera 34 of system 10 with photographic camera 24 in a preferred manner (later explained) such that the alternative image display illustrated in FIGS. 13 and 14 is not required. Rather, with cameras 24, 26 mounted as described below, modules 12R, 12L are preferred as shown in FIG. 2. The mounting mechanism illustrated in FIGS. 6, 7, 8, 15 and 16 provides for driven gimballed movement of the camera mount assembly for selective aiming of the camera lens axis within at least one lens aiming plane and for selective rotation of the camera lens view within an image resolution plane between vertical and horizontal orientations.

More specifically, FIGS. 6, 7, 15 and 16 illustrate the annular or ring-shaped camera mount assembly generally designated 60 and often referred herein as the C-mount assembly because of partial rotation thereof in a circle so as to define a "C"-shape. C-mount assembly is fixed in an upright position by a support plate 62 onto a shelf 44 within camera module 10 in such manner that photographic camera lens 26 faces outwardly toward a user within booth B. If necessary, a mounting block or base 64 (FIGS. 15 and 16) may be placed between base plate 62 and shelf 44.

When constructed as described below C-mount assembly 60 is extremely strong and rigid and thus with cameras 24, 34 properly mounted therein provides the advantage that is resists any change in the precise preselected alignment of cameras 24, 34 so as to maintain focus of the user video image.

C-mount assembly 60 includes a section of ¼ inch tubular aluminum having a high tensile strength approximately 3½ inches wide, the tubing having an interior diameter of approximately 11½ inches and forming a mount ring 66 having a forward edge 66a to which is perpendicularly connected a vertical face plate 68 having an upper edge 68a which curves in conformity with the curve of mount ring 66, and which curved edge straightens at opposed ends as it extends to and terminates at a substantially straight lower edge 68b. Lower edge 68b has welded at opposed ends thereof blocks 69 which are each longitudinally penetrated by a central aperture 71 for journaling therein of respective ends of a preferably steel pivot shaft 73. Shaft 73 rotatably connects to mount plate 62 at positions on shaft 73 just inward of blocks 69. So mounted, C-mount assembly 60 can be selectively tilted in gimballed fashion on shaft 73 forwardly and rearwardly, as may be necessary. Such panning or tilting is effected by user-operation of an appropriate switch, such as that indicated by reference numeral R1 in FIG. 11, and is further described hereafter.

Internally of mount ring 66 is welded a rectangular plate 70 of approximately 7½ inches in length and 3½ inches in width, for mounting thereon of photographic camera 24, which necessarily moves simultaneously and correspondingly with movement of mount ring 66 and face plate 68 so as to vary the user image as desired.

Conventional circuitry effects passage of the signal from switch R1 to motor 77 for effecting operation of gear box 79 which, as illustrated in FIGS. 6-8, in turn causes rotation of a connected shaft 81 and cam 83 which is mounted thereon. Shaft 81 penetrates a heavy, preferably aluminum pivot plate 85 which connects and extends perpendicularly upwardly from one end of mounting plate 62 and is preferably integral therewith.

At the top edge of pivot plate 85 is securely provided a connector such as, for example, screw 87 to which is attached one end of a coil spring 89. The opposed end of coil spring 89 is attached to face plate 68 by fastening to hole 91 which penetrates therethrough. FIG. 8 illustrates that in rotating, cam 83 contacts edgewise a cam roller 93 rotatably mounted as by bracket 95 to face plate 68. Such rotatable edgewise contact of cam 83 and cam roller 93 forces face plate 68 forwardly and outwardly away from mounting plate 62, thus causing camera lens 26 to pan downwardly. Contrariwise, effecting continued rotation of cam 83 by further operation of switch R1 will permit upward tilting of lens 26, which action is assisted by coil spring 89 which is biased so as to gently urge face plate 68 rearwardly to its original upright position simultaneously with such upward tilting.

An annular flange 72 of approximately 2 inches in width is welded perpendicularly to the inner surface of mount ring 66 at forward edge 66a thereof so as to be parallel to face plate 68. An annular bearing 67 having a diameter substantially equal to that of mount ring 66 is disposed between face plate 68 and annular flange 72 and permits smooth rotation of mount ring 66 parallel to and rearwardly of face plate 68. The outer surface of mount ring 66 at forward edge 66a is provided with short parallel longitudinal grooves 74 for improved turning contact by a rubber wheel 76 mounted at the end of drive shaft 78.

Drive shaft 78 is caused to turn by gear motor 80 in response to signals from a conventional micro switch housed in switch box 82 which is mounted as by bracket 84 to face plate 68. Sensors 86, 88 respectively contact grooved, oblong blocks 90, 92 when photo camera 24 is in position for horizontal or vertical snapshots, respectively, and thereby pass information to switch box 82. Such positioning is effected by the user with remote control device R, as for example by operation of a toggle switch, such as that indicated at R2.

Rotation of mount ring 66 past the appropriate stop point for the preselected camera position is prevented by provision of rigid projections 94, 96 outwardly from mount ring 66 and by stop bolt 98 which projects rearwardly from face plate 68 and contacts projections 94, 96 appropriately. These projections 94, 96 and their abutting interaction with stop bolt 98 are seen most clearly in FIGS. 15 and 16.

Figure 11:
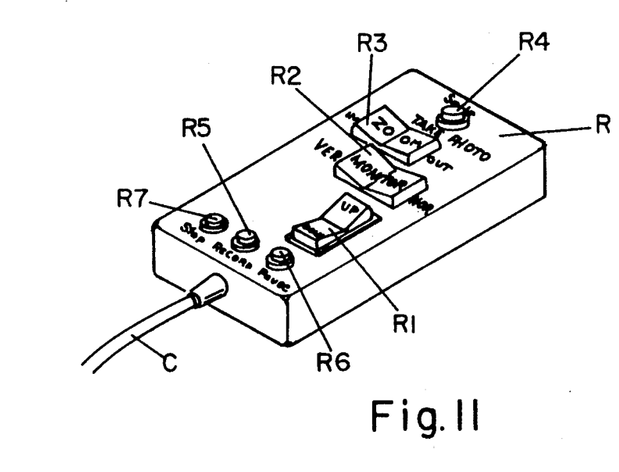
FIG. 11 is a perspective illustration of a remote control device of the system for hand held user operation thereof, to effect control of the system of FIG. 1.

FIG. 7 illustrates a zoom adjustment assembly, generally designated 110, of the present invention. Zoom adjustment assembly 110 attaches to lens 26 of camera 24, as by zoom carriage 112, and is held tightly thereto as by clamp means such as a band or hose clamp (not shown). Zoom carriage 112 is a flat, elongated rigid block provided with one curved end to fit around the lens portion of camera 24, being substantially U-shaped. The arms and base of the U of zoom carriage 112 are approximately one inch deep and the base portion thereof is provided with three consecutive through holes aligned for passage therethrough of two parallel slides 114 and a threaded shaft 116 which is disposed parallel to slides 114 and substantially disposed equidistant therebetween. A forward end of each slide 114 and threaded shaft 116 is connected outwardly to the base of a rigid U-shaped bracket 118. A nylon bushing 120 centered in the base of zoom carriage 112 journals threaded shaft 116 for smooth movement of zoom carriage 112 therealong. Inner ends of slides 114 and threaded shaft 116 connect to a zoom carriage mounting plate 122 which is rigidly fixed to connecting plate 124 as by bolt 126. Connecting plate 124 is in turn fixed to annular flange 72 on mounting ring 66. Rotatably attached to zoom carriage mounting plate 122 are paired nylon gears 128, 130, gear 128 being attached to drive motor 132 and interconnecting with nylon gear 128 which is mounted on zoom carriage drive screw 116 for selective operation forward and rearward operation thereof. Drive motor 132 is connected as by conventional wiring and circuitry (not shown) for operation by the user of system 10, by, for example, triggering of switch R3 on hand control R (FIG. 11).

FIGS. 6, 7 and 9 most clearly illustrate the interrelationship of cameras 24, 34 and the respective connections thereof on C-mount assembly 60. Photographic camera 24 is mounted on rectangular mount plate 70 within ring 66 as, for example by a hexagonal nut and bolt arrangement 134 (seen in FIGS. 15 and 16) so as to face forwardly away from ring 66 and toward the user. Video camera 34, by contrast, faces rearwardly, above photo camera 24 and parallel thereto, and toward mount ring 66.

Video camera 34 is mounted by means of an image rectifier apparatus, generally designated 136, in such manner as to permit the video camera 24 to "see" the same field which the photographic camera provides by lens 26. Image rectifier 136 includes a hollow tube 138 which is preferably rectangular or square in cross-section and has a round hollow arm 140 extending therefrom for secure, light-tight receipt of a lens portion 34 a of video camera 34.

A mirrored surface 142 of a prism is mounted within square tube 138 at an angle so as to face the openings of square tube 138 and arm 140 and is selectively positioned and fixed at a preselected site by adjustment of slot and screw assemblies 133 preferably on the rear surface of square tube 138. Square hollow tube 138 continues and extends upwardly above prism 142 to intersect a rectangular video camera mount plate 144 to which it is welded so as to be fixed and light secure. Video camera mount plate 144 is provided with a longitudinal groove 146 for adjustment of video camera 34 in and out of arm 140. Once satisfactorily positioned video camera 34 is secured at that point by tightening washer and bolt assembly 148 within groove 146 and by tightening of thumbscrews 150 which penetrate through plate 144. Plate 144 has secured at an inner end thereof, as for example by welding, a hollow extension 152 having a preferably rectangular or square cross section and which extends outwardly to a point where it is welded to curved shoe-like plate 154. Curved plate 154 is in turn secured, for example as by bolts, to the inside surface of mount ring 66 so as to be rigidly fixed thereto.

Image rectifier 136 and video camera 34 which is connected thereto are carefully attached to camera mount assembly 60 in such manner so as to leave a narrow space 156 just above the optical glass (or condensing lens) 158 of the view finder of 35 mm photographic camera 24.

The described construction permits "air focusing" of the image to be "taken" by lens 26 or by video camera 34, by permitting the image to be focused by condensing lens 158 at a point F in the air space 156 between mirrored surface 142 within image rectifier 136 and reflex mirror 160 within photo camera 24.

Moreover, the described construction permits the video and photographic cameras 34, 24, respectively, to be carefully positioned in relationship to each other in such a manner that they will not accidentally shift nor have to be moved in order to change format from vertical to horizontal, or vice versa. In other words, rotation of mount ring 66 in order to rotate image format from vertical to horizontal, or back again, will not change the relationship of the two cameras to each other; so that altering from photographic to video modes or vice versa will not create problems with focusing. In either case, the degree of focus will be the same, as substantially clear for the video camera as for the photographic camera, because of the air focusing ability. Moreover, such arrangement with the image reflecting from photo camera mirror 160 to image rectifier mirrored surface 142 to the video camera and then to the monitor permits the user to see a "real" image rather than the inverted image which would ordinarily appear because of inversion by the user's eye with use of a single prism.

Figure 1:
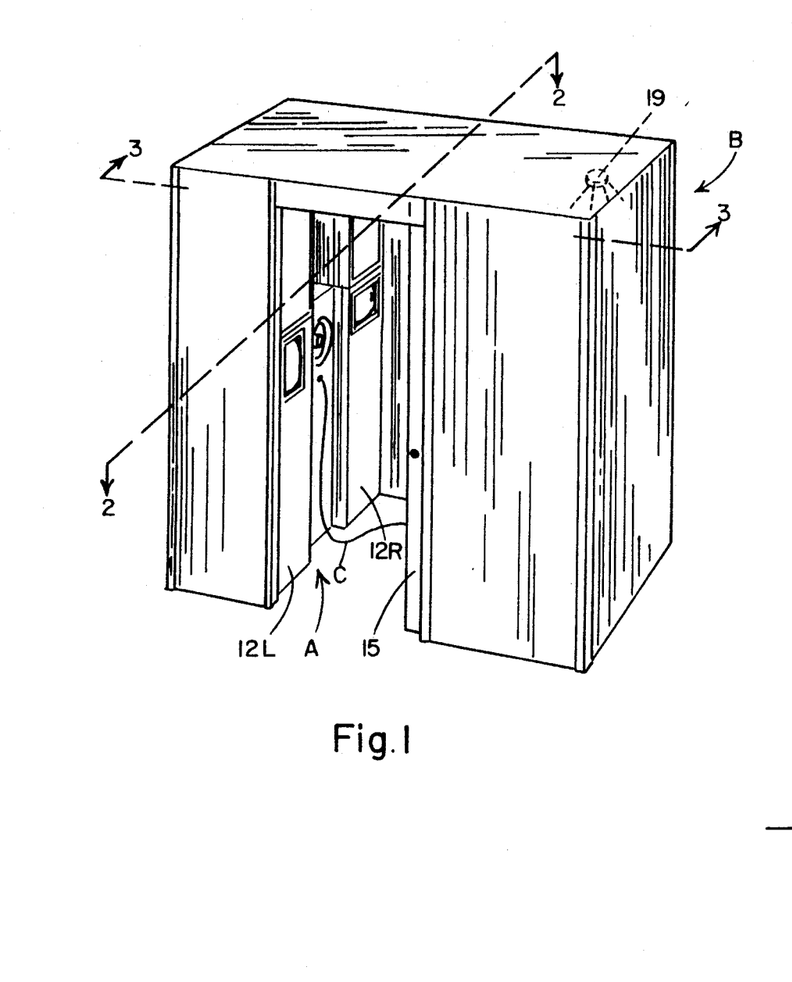
FIG. 1 is a perspective view of a user-actuated modular video/photography system constructed in accordance with the present disclosure and including modules installed in a photobooth shown with door open.

The preferred camera mounting arrangement illustrated in figures permits use of image display modules 12R, 12L as shown in FIGS. 1, 5 and 17, as opposed to the alternative version shown in FIGS. 13 and 14, with the video display screen lying essentially backward so that the image thereby will reflect from a first surface mirror toward the user. Thus, by viewing with the video monitors 12H, 12V, as the case may be, the user has a very realistic idea of what the camera is seeing, whether video or photographic, and then knows what to expect of photographic or video film which the user may choose to record at any given moment.

Thus it may be seen that assembly 10 provides a wide variety of very useful functions. The entire assembly with module portions A and booth B may be provided in stores for photographic or video self portraiture, or, the modules may be installed even on a temporary basis, for example as by renting for use at a wedding reception, birthday party or other private or public functions for user self photography.

Assembled as described and shown in FIG. 1, it is a simple matter for a user or users to enter booth B, close the door to remove unwanted outside lights, and select either the photographic or video mode in horizontal or vertical format as desired. Once the user is satisfied with the image seen on the appropriate display terminal the user may trigger the taking of individual photographs by pushing a button, such as that shown at R4 in FIG. 11, on remote control device R. Alternatively, a foot switch (not shown) may be located near bench 20 for the convenience of certain users, such as parents with small children who must be restrained occupying the user's hands. If preferred the user may operate buttons R5, R6 and R7 (FIG. 11) to control the functioning of a video tape which is recorded automatically on VCR 45. Essentially all that is required at the site of installation of system A is the provision of a few standard electrical outlets and enough floor space to accommodate booth B.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A user-actuated modular photography system for use in a photobooth or like enclosure to provide user self-photography with realistic user-selective user image previewing, comprising:

a first modular enclosure including a photographic camera having a lens oriented for viewing the user when within camera lens view of the photographic camera, a video camera and a camera mount assembly interconnecting the video camera with the photographic camera for video imaging by the video camera of the photographic camera lens view of the user, the video camera providing a user video image signal; and gimbal means for providing driven gimballed movement of the camera mount assembly for selective aiming of the camera lens axis within at least one aiming plane; orientation driven means for rotating the camera mount assembly between vertical and horizontal orientations;

second and third modular enclosures for collocation with the first modular enclosure within a photobooth or like enclosure; at least one of the second and third modular enclosures including video image display means for receiving the user video image signals for display of the user video image for user image previewing prior to user image exposure by the photographic camera; each of the second and third enclosures including photography light sources oriented for illuminating the user for such photographic exposure; and user control means for carrying out user selective remote control of the aiming movement of the camera assembly, user remote actuation of the orientation drive means to thereby provide selective image rotation to a desired vertical or horizontal orientation, and for user selective remote actuation of the photographic camera for thereby capturing user photographic images in accordance with user preview realistic display thereof by the video display means.

2. A user-actuated modular photography system according to claim 1 wherein the gimbal means provides also for gimballed driven movement of the camera mount assembly for selective rotation of the camera lens view within an image resolution plane between vertical and horizontal orientations, and the second and third modular enclosures include respective video image displays for respective vertical and horizontal modes of display of the user video image for such user image previewing, the system further comprising circuit means for causing the video display means to switch automatically between the vertical and horizontal display modes in response to the rotation of the camera lens view.

3. A user-actuated modular photography system according to claim 1 wherein each of the second and third enclosures carries respectively associated light sources for illuminating the subject.

4. A user-actuated modular photography system according to claim 1 wherein each of the light sources comprises a stroboscopic photography light source oriented for illuminating the user for such photographic exposure and a lower-intensity light source oriented for illuminating the user during video imaging of the user for image previewing.

5. A user-actuated modular photography system according to claim 4 wherein each of the respectively associated light sources is mounted within a respective light housing carried atop the second and third modular enclosures.

6. A user-actuated modular photography system according to claim 4 wherein the each lower-intensity light source comprises a multiplicity of lighting devices and diffuser means overlying same for diffusing light therefrom, and wherein the stroboscopic photography light source is colocated with the multiplicity of lighting devices for providing high intensity light through the diffuser means upon photographic exposure.

7. A user-actuated modular photography system for use in a photobooth or like enclosure to provide user self-photography with realistic user-selective user image previewing, comprising;

a camera module having a housing and including a photographic camera having a lens oriented for viewing the user when within camera lens view of the photographic camera, a video camera and a gimballed camera mount assembly interconnecting the video camera with the photographic camera for video imaging by the video camera of the photographic camera lens view of the user, the video camera providing a user video image signal; and gimbal drive means for providing driven gimballed movement of the camera mount assembly for selective aiming of the camera lens axis within at least one aiming plane and for selective rotation of the camera lens view within an image resolution plane between vertical and horizontal orientations;

modular display means for collocation with the camera module within a photobooth or like enclosure, the modular display means including video image display means for receiving the user video image signals for vertical and horizontal modes of display of the user video image for user image previewing prior to user image exposure by the photographic camera;

circuit means for causing the video display means to switch automatically between the first and second display modes in response to the lens vie rotation; and user control mans for carrying out user selective remote control of the aiming movement of the camera assembly user remote actuation of the gimballed drive means to thereby provide selective, lens view rotation to a desired vertical or horizontal orientation, and for user selective remote actuation of the photographic camera for thereby capturing user photographic images in accordance with user previewed realistic display thereof by the video display means.

8. A user-actuated modular photography system according to claim 7 wherein the modular display means comprises distinct vertically and horizontally oriented video image display devices for corresponding vertical and horizontal previewing modes of display of the user video image.

9. A user-actuated modular photography system according to claim 8 wherein the modular display means comprises distinct vertically and horizontally oriented video image display devices for corresponding vertical and horizontal previewing modes of display of the user video image.

10. A user-actuated modular photography system according to claim 9 wherein the modular display means comprises a pair of modular video display enclosures each housing a corresponding one of the vertically and horizontally oriented video image display devices.

11. A user-actuated modular photography system according to claim 10 wherein the camera module comprises a camera module housing and the modular video display enclosures are each adapted for orientation on opposite sides of the camera module housing.

12. A user-actuated modular photography system according to claim 7 wherein the camera module and the modular display means each comprise means to facilitate movement thereof.

13. A user-actuated modular photography system according to claim 12 wherein the means to facilitate movement of the camera module and the modular display means is selectively removable.

14. A user-actuated modular photography system according to claim 10 wherein the vertically and horizontally oriented video image display devices each normally displays a image of the subject which is reversed about a vertical axis, and wherein the modular video display enclosures each comprises means for reversing and presenting accordingly the video display of the respective video image display device whereby to display to the user a realistically re-erected normalized previewing image of the user.

15. A user-actuated modular photography system according to claim 14 wherein the respective video image display device is oriented within the respective video display enclosures for video image projection along an axis inclined relative to the user, and the means for reversing and presenting accordingly the video display of the respective video image display devices comprises a first-surface mirror for reflecting the video image projection and for redirecting the image outwardly from the respective video display enclosure toward the user for previewing.

16. A camera assembly for use in a photobooth or like enclosure to provide user self-photographic with realistic user-selective user image previewing, comprising:
   a photographic camera of single lens reflex type having a lens oriented for focused viewing of a subject to be photographed and a reflex mirror interposed between the lens and film to be exposed;
   a video camera;
   a camera mount assembly interconnecting the video camera with the photographic camera, the lens of the video camera being oriented for receiving for video image resolution by the video camera the same view as the photographic camera lens of the subject without prior image resolution of the image received by the lens of the photographic camera, the video camera providing a video image signal;
   gimbal means for providing driven gimballed movement of the camera mount assembly for selective aiming of the camera lens axis within at least one aiming plane and for selective rotation of the camera lens view within an image resolution plane between vertical and horizontal orientations.

17. A camera assembly according to claim 16, the reflex mirror being movable between its interposed position and a retracted position and when in interposed position normally being intended for providing a reflection of the image received by the lens for viewfinder imaging, the video camera lens having an axis parallel to the photographic camera lens axis.

18. A camera assembly according to claim 16, the gimbal means comprising an annulus of integral character carrying both the photographic and video cameras, the annulus having a central axis in relative alignment with the lens axis of the photographic camera, first mounting means rotatably mounting the annulus for rotation about its central axis, first drive means for driving such rotation selectively to cause said rotation of the camera lens view within an image resolution plane between vertical and horizontal orientations, and second mounting means for rotatably mounting the annulus for rotation about an axis transverse to the photographic camera lens axis, second drive means for driving such transverse axis whereby to cause said selective aiming of the camera lens axis within an aiming plane.

19. A camera assembly according to claim 16, the camera assembly further comprising a condensing lens, means orienting the condensing lens for receiving light reflected from the reflex mirror along an axis intersecting the photographic camera lens axis and for focusing the reflected light at an external focus between the condensing lens and the video camera lens, the external focusing point being thereby external of the photographic camera, for said video image resolution by the video camera.

20. A camera assembly according to claim 19, the condensing lens having a focal length for causing the external focus to be located substantially at an outer surface of the condensing lens facing the video camera lens.

21. A camera assembly according to claim 18, comprising first affixing means for locating the photographic camera internally and centrally of the annulus by affixing the photographic camera to a first peripheral portion of the annulus and second affixing means for locating the video camera internally of the annulus and proximate an inner periphery of the annulus by affixing the video camera to a second peripheral portion of the annulus in rigidly spaced relation to the photographic camera, the gimbal means including a rotating motor drive for selectively rotating the annulus and an aiming motor drive for selectively skewing the annulus to skew correspondingly the image resolution plane relative to the subject, whereby upon rotation of the annulus, the video camera and photographic camera rotate and are aimed as a single entity within the image resolution plane without variance of the physical relationship between the photographic and video cameras to maintain precisely video image resolution by the video camera of the photographic camera lens view of the subject regardless of changing between the vertical and horizontal orientations and regardless of the selective aiming of the camera lens axis.

* * * * *

UNITED STATES PATENT AND TRADEMARK OFFICE
CERTIFICATE OF CORRECTION

PATENT NO. : 5,262,815
DATED : November 16, 1993
INVENTOR(S) : Mel D. Aumiller

It is certified that error appears in the above-identified patent and that said Letters Patent is hereby corrected as shown below:

Column 14, line 17, change "vie" to read --view--;

Column 14, line 19, change "mans" to read --means--.

Signed and Sealed this

Seventeenth Day of May, 1994

Attest:

BRUCE LEHMAN

Attesting Officer     Commissioner of Patents and Trademarks